US010063724B2

United States Patent
Fujii et al.

(10) Patent No.: US 10,063,724 B2
(45) Date of Patent: Aug. 28, 2018

(54) USER INTERFACE FOR MODIFYING A CONTROL'S APPEARANCE TO REFLECT A DEVICE'S CONFIGURATION

(71) Applicant: SEIKO EPSON CORPORATION, Tokyo (JP)

(72) Inventors: Masao Fujii, Matsumoto (JP); Tomohiro Ogawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/409,073

(22) Filed: Jan. 18, 2017

(65) Prior Publication Data

US 2017/0208196 A1    Jul. 20, 2017

(30) Foreign Application Priority Data

Jan. 20, 2016    (JP) ................................ 2016-008512

(51) Int. Cl.
*G06F 3/12* (2006.01)
*H04N 1/00* (2006.01)
*G03G 15/00* (2006.01)

(52) U.S. Cl.
CPC ....... *H04N 1/00506* (2013.01); *G03G 15/502* (2013.01); *H04N 1/00411* (2013.01); *H04N 1/00413* (2013.01); *H04N 1/00432* (2013.01); *H04N 1/00474* (2013.01); *H04N 1/00482* (2013.01); *H04N 1/00466* (2013.01); *H04N 2201/0082* (2013.01)

(58) Field of Classification Search
CPC ........... H04N 1/00506; H04N 1/00411; H04N 1/00413; H04N 1/00432; H04N 1/00474; H04N 1/00482; H04N 1/00466; H04N 2201/0082; G03G 15/502; G03G 15/5087; G03G 15/5091; G06F 3/04886
USPC .......... 358/1.1–1.18; 715/810, 835, 836, 848
See application file for complete search history.

(56) References Cited

U.S. PATENT DOCUMENTS

| | | | |
|---|---|---|---|
| 9,405,253 | B2 | 8/2016 | Sugiura et al. |
| 2006/0132821 | A1* | 6/2006 | Nonaka ............... H04N 1/00127 358/1.13 |
| 2007/0028187 | A1 | 2/2007 | Katsuyama |
| 2010/0287490 | A1 | 11/2010 | Ichimi |
| 2012/0050776 | A1 | 3/2012 | Fukumoto et al. |

FOREIGN PATENT DOCUMENTS

| | | |
|---|---|---|
| EP | 3098660 A | 11/2016 |
| JP | 2012-129836 A | 7/2012 |

OTHER PUBLICATIONS

European Search Report for Application No. 17152389.7 dated Jun. 8, 2017.

* cited by examiner

*Primary Examiner* — Gabriel Garcia
(74) *Attorney, Agent, or Firm* — Workman Nydegger

(57) ABSTRACT

A control unit displays a setting item with respect to print on a touch panel type display, and a print start instruction button in a situation or configuration according to a setting content, which is set in the setting item and is used for the print.

18 Claims, 10 Drawing Sheets

(CHROMATIC COLOR)

(ACHROMATIC COLOR)

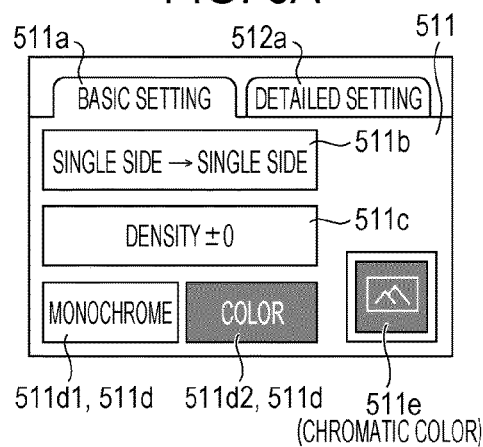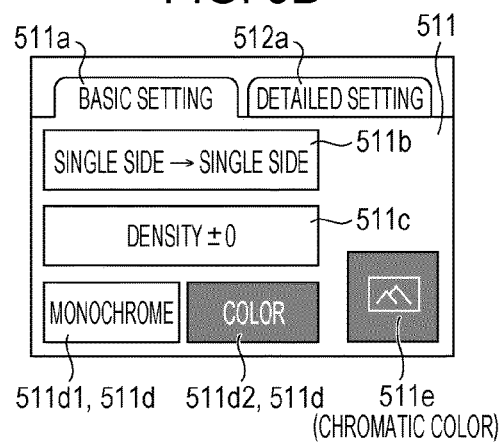

USER INTERFACE FOR MODIFYING A CONTROL'S APPEARANCE TO REFLECT A DEVICE'S CONFIGURATION

CROSS-REFERENCE TO RELATED APPLICATIONS

This application claims priority to Japanese Patent Application No. 2016-008512 filed on Jan. 20, 2016, which is hereby incorporated by reference in its entirety.

BACKGROUND

1. Technical Field

Embodiments of the present invention relate to a printing apparatus, an image reading apparatus, a control program of the printing apparatus, and a control apparatus of the image reading apparatus.

2. Related Art

In the related art, a printing apparatus is known that includes a touch panel type display and a start button (print start instruction button) that is separate from the display (see for example, JP-A-2012-129836). In addition, a technology is known where the start button is displayed on the touch panel type display.

However, in a case where the start button is disposed separately from the display, it is necessary for a user to move his or her finger from the display to the start button after performing setting manipulation (e.g., provide input, enter data) on the display, and thus it is difficult to rapidly press the start button after performing setting. This is being inconvenient.

In contrast, in a case where the start button is displayed on the display, if a size of the display is the same, an area that is used to display information other than the start button becomes narrow or smaller, compared to the case where the start button is disposed outside of the display. It is difficult to make a size of the button (the start button or a setting button of each setting item), which is displayed on the display, smaller than an area in which touch manipulation is easily performed by the finger of the user. Therefore, in a case where the start button is displayed on the display, the number of setting items (the number of setting buttons) which can be displayed on a screen at a time is smaller than a configuration in which the start button is not placed on the display. Therefore, in a case where the user performs setting or checks content, which is already set, the user is frequently required to perform scroll manipulation or switch the screen in order to display a target setting item. As a result, the usability is poor.

SUMMARY

An advantage of some aspects of the invention is that usability of setting screen of a printing apparatus and an image reading apparatus is improved.

According to an aspect of the invention, a printing apparatus is provided that includes a touch panel type display and a control unit. Furthermore, the control unit displays a setting item with respect to print and/or copy and a print start instruction button in a situation according to setting content, which is set in the setting item and is used for the print, on the display.

According to the aspect of the invention, the print start instruction button has a function of notifying a user of the setting content of the setting item with respect to the print in addition to a function as a Graphic User Interface (GUI) button which receives a print start instruction. Thus it is possible to effectively use a limited space of a screen of the display. Thus, the start button may convey the settings of the apparatus. The settings may be reflected in the appearance, color, dimensions, shape, or other aspect of the start button or of the print start instruction button.

In addition, after setting manipulation is performed (e.g., a setting content of the apparatus is set or selected), a user can recognize the setting content (e.g., chromatic/achromatic, density, copies, single/double side, allocation, binding, or the like or combination thereof) that has been set or selected according to the situation or appearance of the print start instruction button. This allows the user to perceive, for example, setting errors or settings that may have been forgotten by the user before the print start instruction button is tapped. Thus it is possible to prevent the printing errors or to change settings before the print start instruction button is tapped. As a result, it is possible to improve the usability of a setting screen. Meanwhile, setting content which is used for the print means setting content which can be printed and is used for the print, and may not include setting content which is difficult to be print.

BRIEF DESCRIPTION OF THE DRAWINGS

Embodiments of the invention will be described with reference to the accompanying drawings, wherein like numbers reference like elements.

FIGS. 6A to 6B are views illustrating a setting screen.

DESCRIPTION OF EXEMPLARY EMBODIMENTS

Figure 1:
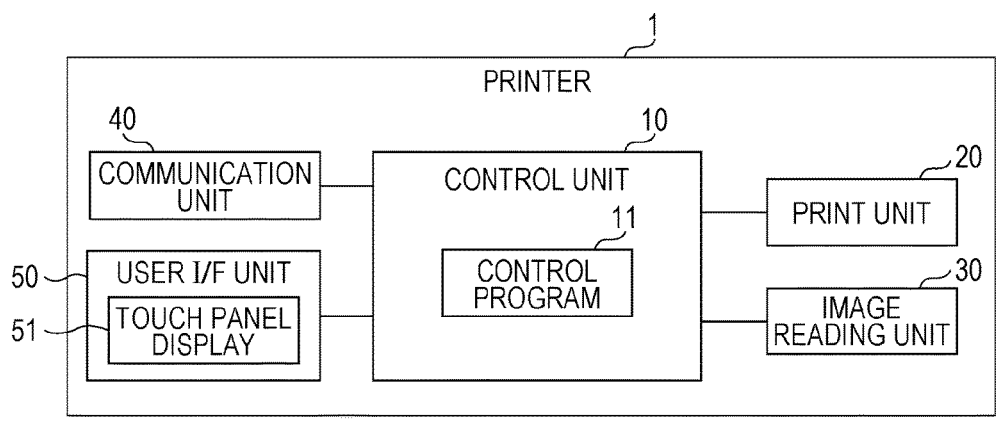
FIG. 1 is a block diagram illustrating a configuration of a printer.

Hereinafter, embodiments of the invention will be described with reference to the accompanying drawings. Also, the same reference numerals are attached to relevant components in each drawing, and the description thereof will not be repeated.

1. First Embodiment 1-1. Configuration of Printer:
FIG. 1 is a block diagram illustrating an example configuration of a printer 1 according to an embodiment of the invention. The printer 1 includes a control unit 10, a print unit 20, an image reading unit 30, a communication unit 40, and a user I/F unit 50. The printer 1 may also be formed to include an image reading function. Accordingly, the printer 1 corresponds to a printing apparatus and an image reading apparatus.

The print unit 20 may include an actuator sensor, a drive circuit, and a machine component which perform printing on a printing medium, such as photographic paper, plain paper, or OHP sheet, using a well-known printing method such as an ink jet method or an electro-graphic method. The image reading unit 30 may include a well-known color image sensor that emits light to a document which is mounted on a document table, divides reflected light from the document into respective colors of RGB, and uses scan image data, and an actuator, which transport a document, a drive circuit, and a machine component.

The communication unit 40 includes various communication interfaces for wired and/or wireless communication with external devices. In addition, the communication unit 40 includes an interface for communication with various removable memories that are mounted on the printer 1. The user I/F unit 50 includes a touch panel display 51 (hereinafter, simply referred to as a display 51) and a key input unit which is not illustrated in the drawing. The display 51 includes a display panel that displays various pieces of information based on control of the control unit 10, and a touch detection panel that is superimposed on the display panel, and detects touch manipulation performed by a pointing object, such as a finger of a person, according to a well-known method such as a capacitive sensing method, a resistive film method, and an optical method. Furthermore, the display 51 outputs information (for example, coordinates of a touch start position and a touch end position, or the like) that indicates the touch manipulation to the control unit 10.

Using a pointing object, a user is able to interact with the display 51 of the printer 1 to provide input, set setting contents, change setting contents, initiate printing or copying, or the like.

The control unit 10 includes a CPU, a ROM, a RAM, a nonvolatile memory, and the like which are not illustrated in the drawing. The CPU is capable of performing or executing a control program 11, which is recorded or stored in the ROM or the nonvolatile memory, using the RAM or the nonvolatile memory. The control program 11 is a program that displays various pieces of information on the display 51. In a case where manipulation (including, for example, tapping, swiping, pinching-in, pinching-out, or the like) performed on the display 51 is detected based on information indicative of the touch manipulation acquired from the display 51, the control program 11 causes the printer 1 to realize a function of performing a process corresponding to the manipulation by controlling each of the units of the printer 1. Thus, the printer 1 is controlled in accordance with the input received via the display 51.

Specifically, in a setting screen of the printer 1, the control program 11 includes a display control function of displaying a start button (corresponding to a print start instruction button or an image reading start instruction button) in a situation according to setting content which is set by a user. A plurality of setting items are presented in the setting screen and the user is capable of changing the setting content for each setting item. Information indicative of the setting content which is set in each setting item is recorded in the RAM or the nonvolatile memory, and the information is rewritten according to change manipulation of the user. Thus, various buttons or other images (e.g., icons, menus, tabs, selectors, etc.) may be displayed on the display 51. The buttons or other images may correspond to different functions or settings that are performed or set when the button is selected or manipulated. The buttons or other images may, for example, also correspond to print or image settings that may be accounted for when printing is started or when an image is scanned by tapping a start button.

1-2: Display Situation of Start Button:

FIGS. 2A to 8C illustrate examples of screens which are displayed on the display 51 of the printer 1. The screens are setting screens with respect to a copy function of the printer 1. In a case where the control unit 10 detects manipulation (e.g., tapping, swiping, pinching-in, pinching-out, or the like) which indicates a request to display a copy function setting screen (or a print function setting screen), the control unit 10 displays the copy function setting screen on the display 51. In the embodiment, the copy function setting screen is provided with an area. A basic setting screen 511 or a detailed setting screen is displayed, in a switchable manner, in a part of the area thereof. Furthermore, the plurality of setting items with respect to the copy function of the printer 1 are assigned to be displayed in any one of the basic setting screen 511 and the detailed setting screen. The basic setting screen 511 is a screen which is displayed in a case where the basic setting tab 511a is tapped. The detailed setting screen is a screen which is displayed in a case where a detailed setting tab 512a is tapped. Meanwhile, each divided drawings of FIGS. 2A to 8C illustrates that the basic setting screen 511 is selected and displayed.

In the embodiment, the basic setting screen 511 includes a double side print setting button 511b, a density setting button 511c, a color setting button 511d, and a start button 511e. The start button 511e is a button which receives the print start instruction. In a case where it is detected that the start button 511e is tapped, the control unit 10 performs a copy process based on the setting content of each setting item, which will be described later, by controlling the image reading unit 30, the print unit 20, and the communication unit 40.

The double side print setting button 511b is a button that includes a function of displaying setting content which is set to a setting item with respect to double side print, and a function of receiving a change in the setting content for the setting item. The options of the setting content include "single side→single side" and "single side→double side". In a case where it is detected that the double side print setting button 511b is tapped, the control unit 10 presents the above-described options, and records an option, which is tapped and selected by the user, of the presented options as the setting content in the RAM. Furthermore, the control unit 10 ends presentation of the options, and displays the double side print setting button 511b which includes letters indicative of the selected content (for example, "single side→double side" or the like) which is selected by the user. The control unit 10 may end the presentation of the options when an option is selected, for example (e.g., when a user taps one of the options).

Meanwhile, any situation may be used for a method of presenting the above-described options after the double side print setting button 511b is tapped. In other words, the above-described options may be presented in different manners. For example, the options may be displayed through pop-ups. The options may be displayed through a drop-down list. The options may be presented after transition to a hierarchy screen in advance, or selected content may be updated (replaced in order of single side→single side and single side→double side) according to the number of times that the double side print setting button 511b is tapped.

The density setting button 511c is a button that includes a function of displaying setting content which is set to a setting item with respect to a print density, and a function of receiving change in the setting content for the setting item. The setting content for the various setting contents, in one example, may be a value for a particular setting. For example, it is possible to select "−2", "−1", "±0", "+1", and "+2" as the setting content for the density setting. In a case where it is detected that the density setting button 511c is tapped, the control unit 10 presents the above-described option. The control unit 10 ends presentation of the option which is recorded in the RAM while using the option, which is selected from the presented options by the user, as the setting content, and displays the setting content on the density setting button 511c. The density setting button 511c allows a user to select a density and, in one example, the selected density may be shown in the button 511c.

The color setting button 511d is a button group for setting the setting item with respect to color print, that is, selecting color print or monochrome print. The color setting button 511d may include a monochrome button 511d1 and a color button 511d2. In a case where it is detected that the color button 511d2 is tapped, the control unit 10 records information indicative of "color" as setting content of a setting item with respect to the color print in the RAM, and highlights the color button 511d2 rather than the monochrome button 511d1. In a case where it is detected that the monochrome button 511d1 is tapped, the control unit 10 records information indicative of "monochrome" as the setting content of the setting item with respect to the color print in the RAM, and highlights the monochrome button 511d1 rather than the color button 511d2.

Figure 2A:
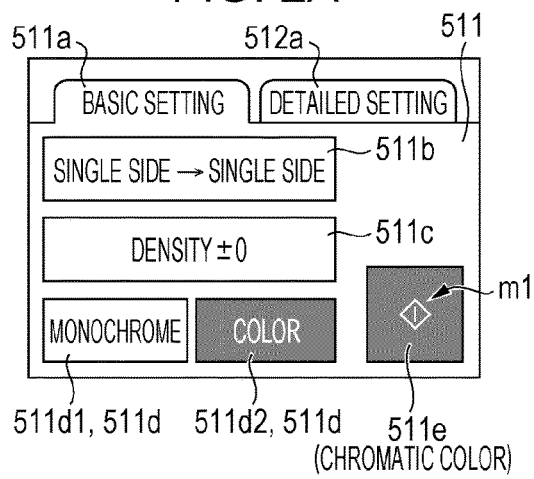
FIGS. 2A to 2D are views illustrating a setting screen.

The start button 511e illustrated in FIG. 2A indicates a start button in an initial state (default state). The start button 511e of FIG. 2A simultaneously indicates that "single side-→single side" is set to a setting item with respect to double side print, "±0" is set to a setting item with respect to a print density, and "color" is set to a setting item with respect to color print (the color button 511d2 is highlighted rather than the monochrome button 511d1) (meanwhile, in the initial state, the setting content of each setting item included in the detailed setting screen is not reflected in the start button 511e). In this case, as illustrated in FIG. 2A, the start button 511e is displayed in a square shape with a chromatic color.

Meanwhile, a mark m1 (a mark which is formed with a square and straight line in the square) around the center of the start button 511e is a mark which indicates that the button is the start button. Based on the state, an example in which the basic setting screen 511 or the start button 511e, which is acquired in a case where the setting content of the various setting items is changed in the detailed setting screen, is displayed will be sequentially described. Furthermore, in a case where the start button 511e, which is acquired in a case where the setting content is changed, is touched by the user, the printer 1 starts copy based on the set setting content, and produces printed matter. Meanwhile, the start button 511e whose situation is changed from the initial state through the change in setting may return to the initial state again in a case where, for example, the start button 511e is tapped once and copy is performed.

Figure 2B:
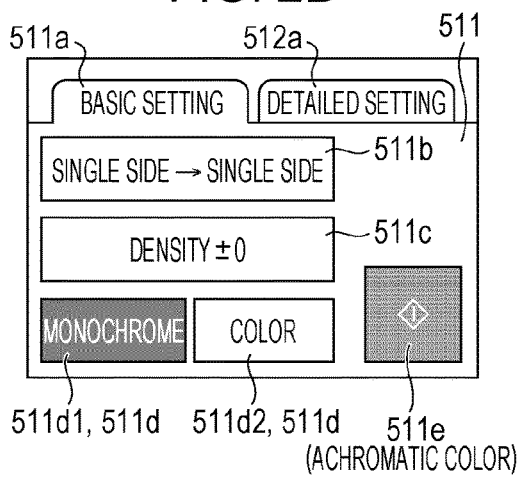

In a case where it is detected that the user taps the monochrome button 511d1 in a state in which the screen illustrated in FIG. 2A is displayed on the display 51, the control unit 10 changes the setting content of the setting item with respect to the color print from a color to a monochrome color, highlights the monochrome button 511d1 as illustrated in FIG. 2B, and displays a color of the start button 511e after changing a chromatic color of the start button 511e, which indicates color print, to an achromatic color which indicates monochrome print. Thus, the color or appearance of the start button 511e may change (from chromatic to achromatic or vice versa) in response to changes in the color setting button 511d.

As described above, compared to a case in which the color of the start button 511e is not changed, it is easy to cause the user to intuitively recognize a change in or a state of the setting content of the setting item with respect to the color print when the color of the start button 511e is changed in accordance with the setting content.

In addition, in a case where the color of the start button 511e is changed, it is possible to grasp the setting content of the setting item with respect to the color print by the color of the start button 511e. The setting content may be visually recognized in a case where the start button 511e is tapped. Furthermore, the user is capable of tapping the start button 511e in a state in which the setting content is grasped, and thus, as a result, it is possible to prevent printing errors. Thus, the user can visually determine whether the printer 1 is set to print in chromatic or achromatic based on the color of the start button 511e.

Figure 2C:
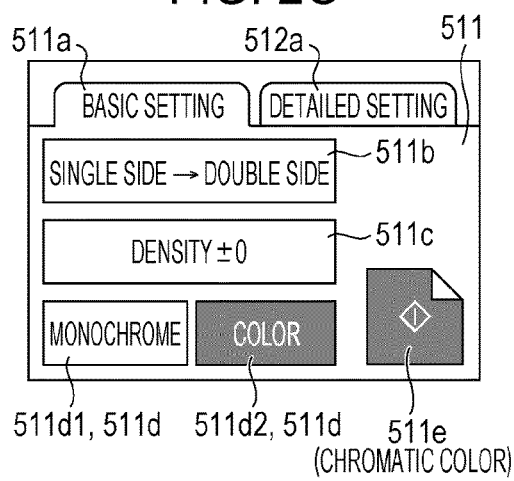

Subsequently, in a case where it is detected that the double side print setting button 511b is tapped and the setting content is changed from "single side-→single side" to "single side-→double side" in the state in which the screen illustrated in FIG. 2A is displayed on the display 51, the control unit 10 maintains the color of the start button 511e as the chromatic color in the same density without change, and changes the form of the start button 511e to a form as illustrated in FIG. 2C. Specifically, the control unit 10 displays the start button 511e which expresses that an upper right corner of a printing paper is folded to a near side and a rear surface of the printing paper is seen. That is, the start button 511e of FIG. 2C simultaneously expresses that "color" is selected in the setting item with respect to the color print because the color is expressed by the chromatic color, that "single side-→double side" is selected in the setting item with respect to the double side print, and that "±0" is selected in the setting item with respect to the print density.

Figure 2D:
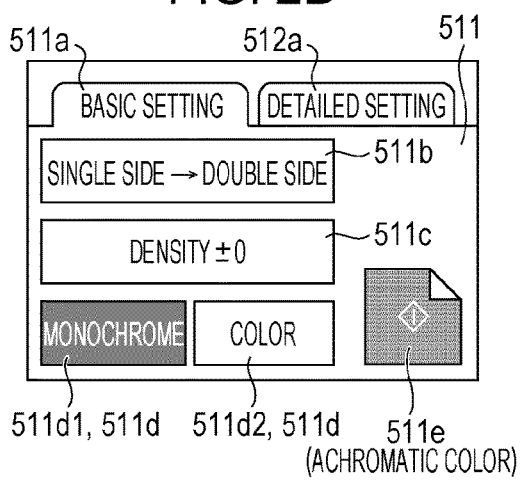

In addition, in a case where it is detected that the double side print setting button 511b is tapped in a state in which the screen illustrated in FIG. 2B is displayed and the setting content is changed from "single side-→single side" to "single side-→double side", the control unit 10 maintains the color as the achromatic color in the same density as in FIG. 2B without change and changes a shape as illustrated in FIG. 2D (shape is in common with FIG. 2C). That is, the start button 511e illustrated in FIG. 2D simultaneously expresses that "monochrome" is selected in the setting item with respect to the color print, "single side-→double side" is selected in the setting item with respect to the double side print, and "±0" is selected in the setting item with respect to the print density.

As described above, the start button 511e may be displayed in a situation according to the setting content of the plurality of setting items. In other words, the start button 511e is configured to reflect the setting content of the setting items. The setting item which indicates the setting content using the color of the start button 511e and the setting item which indicates the setting content using the shape of the start button 511e do not interfere with each other on the design of the start button 511e, and thus it is possible to realize the setting content of the two setting items using the shape and/or color of the start button.

Figure 3A:
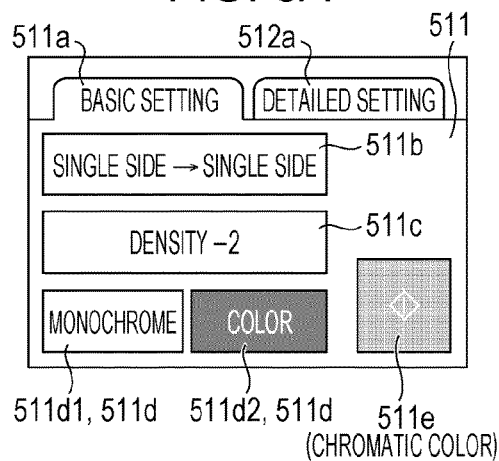
FIGS. 3A to 3D are views illustrating a setting screen.
Figure 3B:
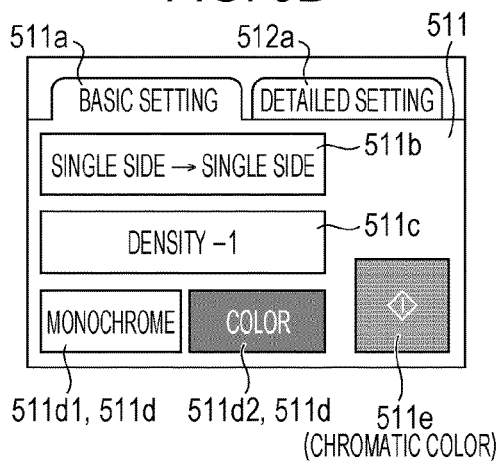
Figure 3C:
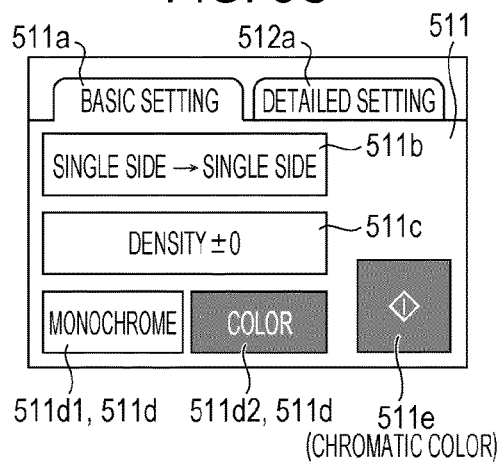
Figure 3D:
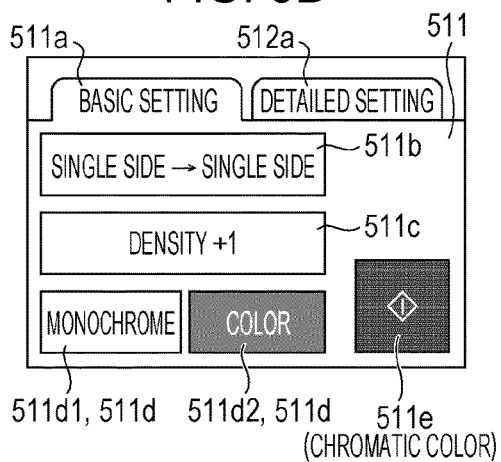

In addition, a setting item which indicates setting content using the color of the start button 511e includes a setting item with respect to a print density. Similarly to FIG. 2A, FIG. 3C illustrates that the basic setting screen 511 is displayed in a state in which "single side-→single side" is set to the setting item with respect to the double side print, "±0" is set to the setting item with respect to the print density, and "color" is set to the setting item with respect to the color print. In a case where it is detected that the density setting button 511*c* is tapped (the setting item with respect to the print density) and the setting content is changed from "±0" to, for example, "−1" in a state in which the screen illustrated in FIG. 3C is displayed, the control unit 10 displays the color of the start button 511*e* using the chromatic color with a color (see FIG. 3B) which is lighter than the color of the start button 511*e* (see FIG. 3C) in a case where "±0" is set. In a case in which the setting content of the setting item with respect to the print density is changed to "−2", the control unit 10 displays the start button 511*e* using a color (see FIG. 3A) which is lighter than the color (see FIG. 3B) in a case of "−1". In a case in which the setting content of the setting item with respect to the print density is changed to "+1", the control unit 10 displays the start button 511*e* using a color (see FIG. 3D) which is darker than the color (see FIG. 3C) in the case of "±0". Although not illustrated in the drawing, in a case where the setting content is changed to "+2", the control unit 10 displays the start button 511*e* using a color which is further darker than the color (see FIG. 3D) in the case of "+1". As described above, in a case where a depth of the color of the start button 511*e* is associated with the change in the content of the setting item with respect to the print density, it is possible to cause the user to easily recognize the setting content.

Meanwhile, although not illustrated in the drawing, in a case where the setting content of the setting item with respect to the print density is changed from a state in which the screen illustrated in FIG. 2B is displayed (a state in which monochrome is selected in the setting item with respect to the color print), the density of the start button 511*e* may be changed while maintaining achromatic color in association with the setting content of the setting item with respect to the print density.

Here, the situation, in which the start button 511*e* is displayed according to the setting content of the setting item or items which are assigned to the basic setting screen 511, is described. In sum, FIGS. 2A-3D described above illustrate that setting items associated with color, density, and/or single/double side (or other setting items) can be determined from a state or configuration of the start button 511*e*. Further, the state or configuration of the start button 511*e* may dynamically adjust as the setting content of these setting items is changed. A user can quickly determine the state of setting items of the printer 1 when viewing the start button 511*e*.

Subsequently, a situation, in which the start button 511*e* is displayed according to setting content of a setting item which is assigned to the detailed setting screen, will be described. In a case where it is detected that the user taps the detailed setting tab 512*a*, the control unit 10 displays the detailed setting screen on the display 51 instead of the basic setting screen 511.

The detailed setting screen may include, for example, a number of copies to be printed setting button, an allocation setting button, a binding position setting button, a margin setting button, a paper size setting button, a paper-type setting button, a feeding method setting button, a print quality setting button, a print magnification setting button, a document-type setting button, a watermark print setting button (not illustrated in the drawing), and the like or a combination thereof. Although the start button 511*e* may or may not be displayed in the detailed setting screen, a description will be provided which assumes that the start button 511*e* is not displayed on the detailed setting screen in the embodiment. Accordingly, in the embodiment, it is necessary for the user to tap the basic setting tab 511*a* again and display the basic setting screen 511 in order to tap the start button after setting the setting items included in the detailed setting screen. In one example, the detailed settings may be provided on multiple tabs. Further, the start button could also be included in the detailed setting screen.

Meanwhile, the paper type indicates a type of a printing medium (recording medium), and, for example, "plain paper", "picture paper", or the like is assumed. The document type indicates a type of content which is included in a document corresponding to a copy source, and, for example, a "picture", a "letter", or the like is assumed.

Figure 4A:
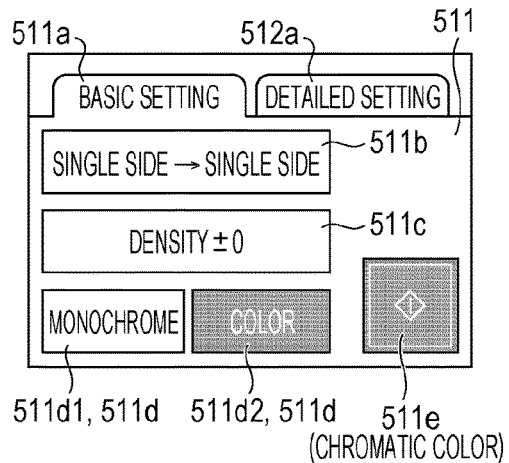
FIGS. 4A to 4C are views illustrating a setting screen.
Figure 4B:
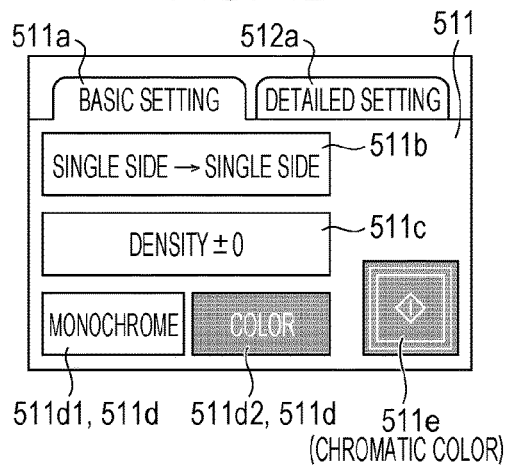
Figure 4C:
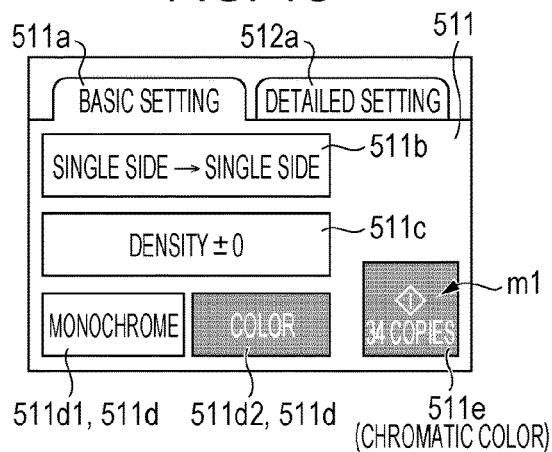

First, an example in which the start button 511*e* is displayed according to the setting content of the setting item with respect to the number of copies to be printed will be described with reference to FIGS. 4A to 4C. In a case where it is detected that the user taps the detailed setting tab 512*a* in the state in which the screen illustrated in FIG. 2A is displayed, setting content of a setting item with respect to the number of copies to be printed may be changed to two copies or three copies (or other number) by tapping a print copy number setting button displayed in the detailed setting screen. Then, the basic setting tab 511*a* is tapped and the control unit 10 displays the basic setting screen 511. The control unit 10 also changes a shape of an outer edge of the start button 511*e* to a shape as illustrated in FIG. 4A or 4B. FIG. 4A illustrates the start button 511*e* acquired or displayed in a case where the number of copies to be printed is set to two copies, and FIG. 4B illustrates the start button 511*e* acquired or displayed in a case where the number of copies to be printed is set to three copies. Specifically, FIGS. 4A and 4B illustrate that the number of copies to be printed becomes two copies by increasing or adding a line to the start button 511*e*. In FIG. 4A, a periphery of the start button 511*e*, and a similar-shaped rectangular frame line in the outer edge of the start button 511*e* indicate that the number of copies to be printed is two. Similarly, FIG. 4B illustrates that the number of copies to be printed becomes three copies by increasing or adding to the rectangular frame line by two in the outer edge. In other words, the outer periphery of the start button 511*e* and two internal lines, which may be formed in an outer edge of the start button 511*e* (for a total of three lines), indicate that the number of copies to be printed is three. The lines added to the start button 511*e* may be rectangular frame lines as shown in FIGS. 4A-4B.

Meanwhile, it may be difficult for the user to see if the number of rectangular frame lines is too great. Therefore, in a case where a predetermined number of copies to be printed (for example, 4 copies) or more is set, a number which indicates the number of copies to be printed may be displayed at the bottom of or underneath the mark m1 of the start button 511*e*, as illustrated in FIG. 4C.

As described above, it is possible to cause the user to easily recognize setting content of the setting item with respect to the number of copies to be printed, which is not displayed in the same screen as the start button 511*e*, by reflecting the setting item in the start button 511*e*. Therefore, it is not necessary for the user to display the detailed setting screen by tapping the detailed setting tab 512*a* again in order to check the setting content of the setting item with respect to the number of copies to be printed. This provides convenience to a user. Thus, setting content of the setting items in the basic setting tab 511*a* and/or in the detailed setting tab 512*a* may be reflected in the start button 511*e*.

Although some examples are described herein with the assumption that the screen or display is in the state shown in FIG. 2A, embodiments of the invention may start from a different state.

Figure 5A:
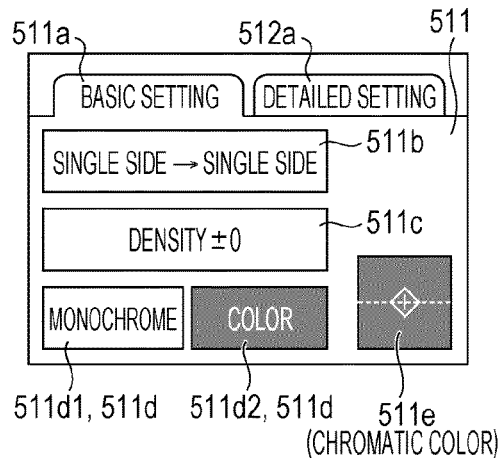
FIGS. 5A to 5D are views illustrating a setting screen.
Figure 5B:
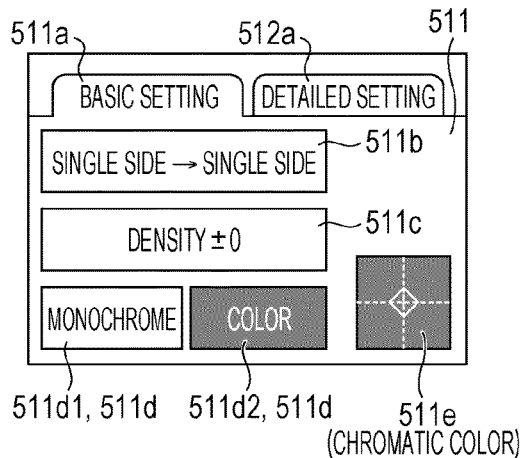

Subsequently, an example in which the start button 511e is displayed according to the setting content of the setting item with respect to the allocation will be described with reference to FIGS. 5A and 5B. In a case where it is detected that the user taps the detailed setting tab 512a in the state in which the screen illustrated in FIG. 2A is displayed (although a different state may be displayed), the setting content of the setting item with respect to the allocation is changed by manipulating the allocation setting button in the displayed detailed setting screen. After manipulating the allocation setting button, the basic setting tab 511a may be tapped and the control unit 10 displays the basic setting screen 511. The control unit 10 also changes the shape of the start button 511e to a shape as illustrated in FIG. 5A or 5B. Thus, the setting content of the allocation setting is reflected in the start button 511e. Options of the setting content of the setting item with respect to the allocation include, for example, "two-page allocation" and "four-page allocation". FIG. 5A illustrates the start button 511e acquired or displayed in the display 51 in a case in which the two-page allocation is set. FIG. 5B illustrates the start button 511e acquired or displayed in the display 51 in a case in which the four-page allocation is set. Specifically, FIGS. 5A and 5B illustrate that the start button 511e is divided into two parts in a case of the "two-page allocation" and is divided into four parts in a case of the "four-page allocation". As described above, it is possible to cause the user to easily recognize the setting content of the setting item with respect to the allocation, which is not displayed in the same screen as the start button 511e in one embodiment, according to the situation or configuration of the start button 511e.

Figure 5C:
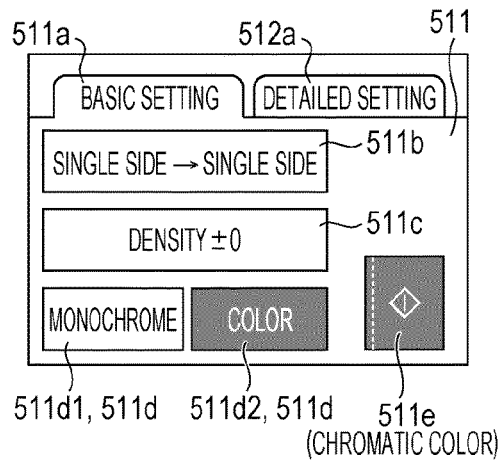
Figure 5D:
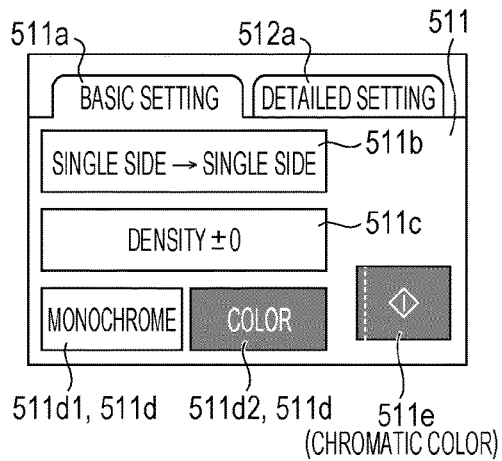

Subsequently, an example in which the start button 511e is displayed according to the setting content of the setting item with respect to the binding position will be described with reference to FIGS. 5C and 5D. In a case where it is detected that the user taps the detailed setting tab 512a in the state in which the screen illustrated in FIG. 2A is displayed, changes to the setting content of the setting item with respect to the binding position by manipulating the binding position setting button in the displayed detailed setting screen may be performed. When the basic setting tab 511a is tapped, the control unit 10 displays the basic setting screen 511 and changes the shape of the start button 511e of the basic setting screen 511 to a shape as shown in FIG. 5C or 5D. Options of the setting content of the setting item with respect to the binding position include, for example, "long side binding" and "short side binding". FIG. 5C illustrates the start button 511e in a case where the long side binding is set. Specifically, the long side binding is illustrated by forming the square start button 511e to have a vertically long shape and displaying a broken line which is parallel to the side in the vicinity of one of two long sides. FIG. 5D illustrates the start button 511e in a case where the short side binding is set. Specifically, the short side binding is illustrated by forming the square start button 511e to have a horizontally long shape and displaying a broken line which is parallel to the side in the vicinity of one of two short sides. As described above, it is possible to cause the user to easily recognize the setting content of the setting item with respect to the binding position, which setting item is not displayed in the same screen as the start button 511e, according to the situation or configuration of the start button 511e.

Subsequently, an example in which the start button 511e is displayed according to the setting content of the setting item with respect to the margin will be described with reference to FIGS. 6A and 6B. In a case where it is detected that the user taps the detailed setting tab 512a in the state in which the screen illustrated in FIG. 2A is displayed, the setting content of the setting item with respect to the margin is changed by manipulating the margin setting button in the displayed detailed setting screen. When the basic setting tab 511a is tapped, the control unit 10 displays the basic setting screen 511 and changes the shape of the start button 511e and of an internal image of the start button 511e as illustrated in FIGS. 6A and 6B. Options of the setting content of the setting item with respect to the margin include "existence of margin" and "non-existence of margin". FIG. 6A illustrates the start button 511e acquired in a case where the "existence of margin" is set. Specifically, an area is provided which indicates a margin in the outline part of the button, and an image which indicates a picture is displayed on the button instead of the mark m1. FIG. 6B illustrates the start button 511e in the case where the "non-existence of margin" is set. Specifically, although an image which indicates a picture is displayed on the start button instead of the mark m1, "non-existence of margin" is realized in such a way that an area which indicates the margin is not provided in the outline part of the button. As described above, it is possible to cause the user to easily recognize the setting content of the setting item with respect to the margin, which is not displayed in the same screen as the start button 511e, according to the situation of the start button 511e. FIG. 6A, for example, effectively illustrates a margin in the start button 511e while FIG. 6B does not include a margin in the start button 511e.

Figure 7A:
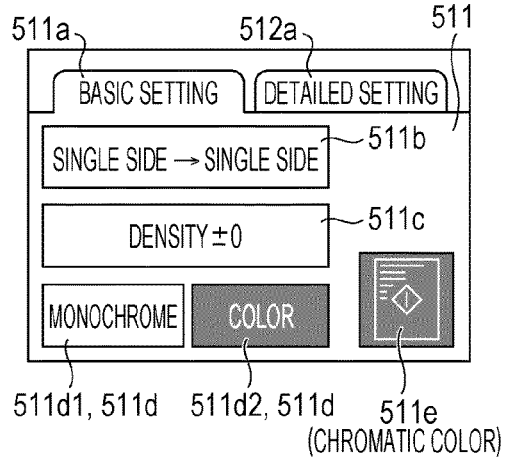
FIGS. 7A to 7F are views illustrating a setting screen.
Figure 7B:
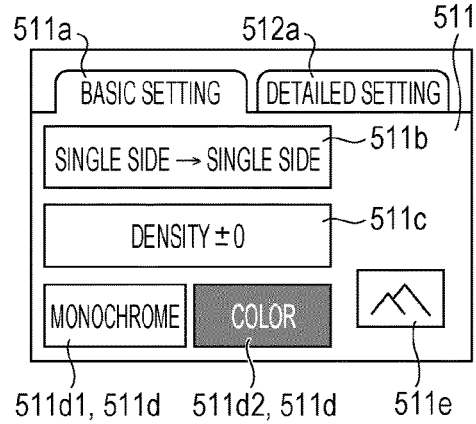

Subsequently, an example in which the start button 511e is displayed according to the setting item with respect to the paper type will be described with reference to FIGS. 7A and 7B. In a case where it is detected that the user taps the detailed setting tab 512a in the state in which the screen illustrated in FIG. 2A is displayed, the setting content of the setting item with respect to the paper type is changed by manipulating the paper-type setting button in the displayed detailed setting screen. After manipulating the paper-type setting button, the basic setting tab 511a is tapped. Then, the control unit 10 displays the basic setting screen 511 and changes the shape and the internal image of the start button 511e as illustrated in FIGS. 7A and 7B. Options of the setting content of the setting item with respect to the paper type include "plain paper", "picture paper", and the like. FIG. 7A illustrates the start button 511e acquired or displayed in a case where "plain paper" is set. FIG. 7B illustrates the start button 511e in a case where "picture paper" is set.

Figure 7C:
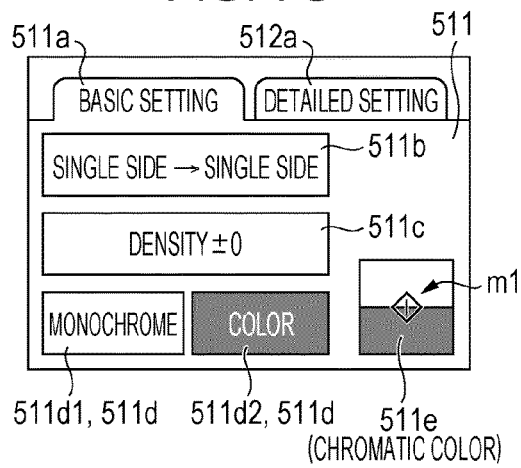
Figure 7D:
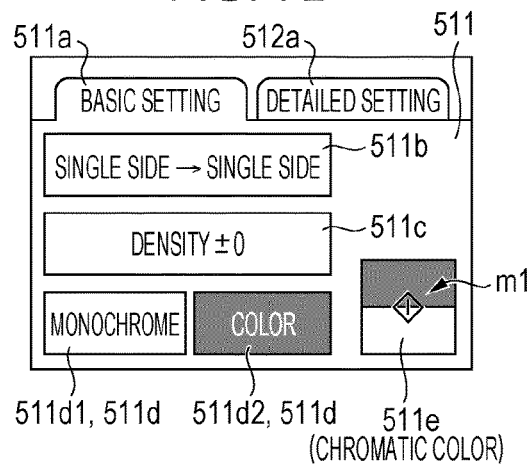

Subsequently, an example in which the start button 511e is displayed according to the setting item with respect to the feeding method will be described with reference to FIGS. 7C and 7D. In a case where it is detected that the user taps the detailed setting tab 512a in the state in which the screen illustrated in FIG. 2A is displayed, the setting content of the setting item with respect to the feeding method is changed by manipulating the feeding method setting button in the displayed detailed setting screen. When the basic setting tab 511a is tapped after manipulating the feeding method setting button, the control unit 10 displays the basic setting screen 511 and changes the shape of the start button 511e as illustrated in FIGS. 7C and 7D. Options of the setting content of the setting item with respect to the feeding method includes "lower tray", "upper tray", and the like. FIG. 7C illustrates the start button 511e in a case where the "lower tray" is set. FIG. 7D illustrates the start button 511e in a case where the "upper tray" is set.

Figure 7E:
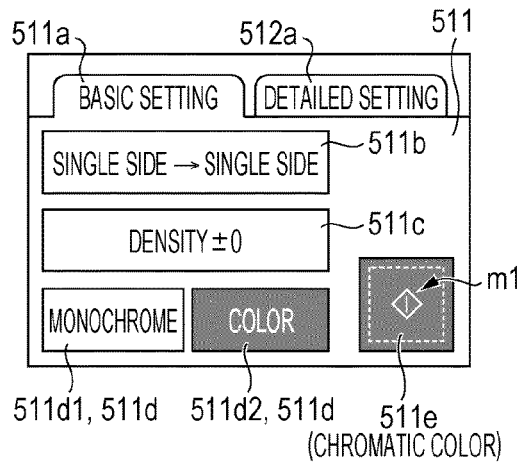
Figure 7F:
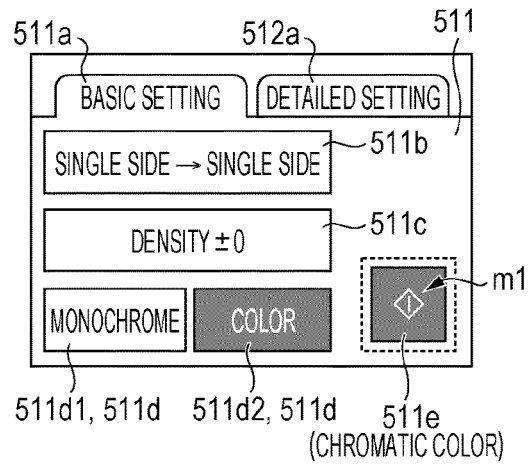

Subsequently, an example in which the start button 511e is displayed according to the setting item with respect to the print magnification will be described with reference to FIGS. 7E and 7F. In a case where it is detected that the user taps the detailed setting tab 512a in the state in which the screen illustrated in FIG. 2A is displayed, the setting content of the setting item with respect to the print magnification is changed by manipulating the print magnification setting button in the displayed detailed setting screen. Then, the basic setting tab 511a is tapped and the control unit 10 displays the basic setting screen 511 and changes the shape of the start button 511e as illustrated in FIGS. 7E and 7F. A numerical value corresponding to enlargement or a numerical value corresponding to reduction is set as the setting content of the setting item with respect to the print magnification. FIG. 7E illustrates the start button 511e in a case where the numerical value corresponding to enlargement is set. FIG. 7F illustrates the start button 511e in a case where the numerical value corresponding to reduction is set.

Figure 8A:
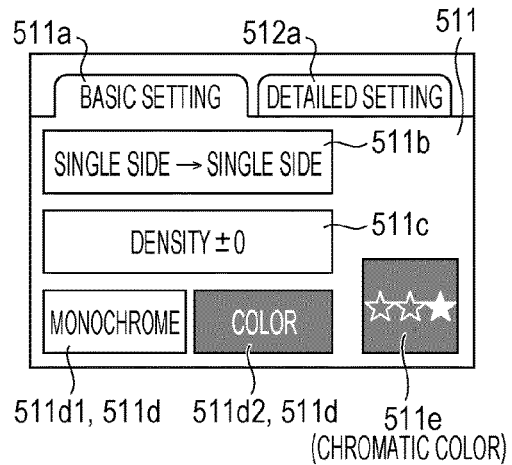
FIGS. 8A to 8C are views illustrating a setting screen.

Subsequently, an example in which the start button 511e is displayed according to the setting item with respect to the print quality will be described with reference to FIG. 8A. In a case where it is detected that the user taps the detailed setting tab 512a in the state in which the screen illustrated in FIG. 2A is displayed, the setting content of the setting item with respect to the print quality is changed by manipulating the print quality setting button in the displayed detailed setting screen. After manipulating the print quality setting button, the basic setting tab 511a may be tapped and the control unit 10 displays the basic setting screen 511 and changes the shape of the start button 511e as illustrated in, for example, FIG. 8A. The print quality may be realized according to positions and the number of start marks which are painted as illustrated in FIG. 8A.

Figure 8B:
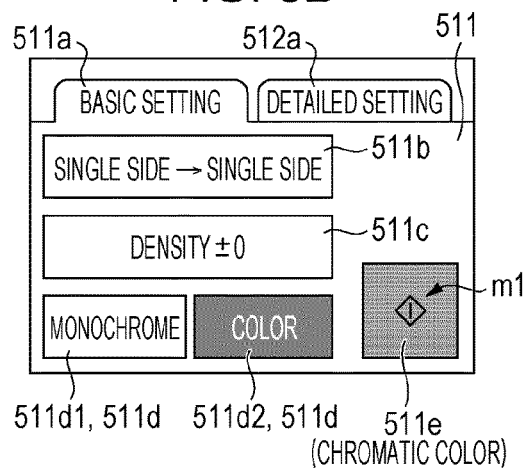

Meanwhile, FIG. 8B illustrates an example in which the start button 511e is displayed in a case where a watermark print is set in a setting item with respect to the watermark print.

Figure 8C:
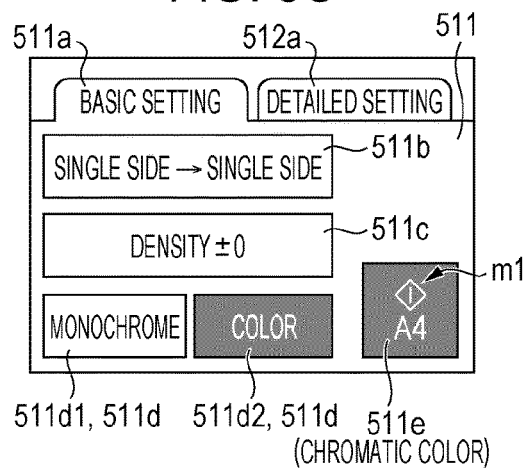

Meanwhile, a configuration in which a user may be notified of the setting content according to letters in the start button 511e may be used. For example, FIG. 8C illustrates a situation of the start button 511e in a case where the setting content of the setting item with respect to a paper size is set to "A4". Letters "A4" are displayed at the bottom of or underneath the mark m1.

As described above, it is possible to cause the user to recognize the setting content before the start button 511e is tapped by changing the situation or configuration of the start button 511e according to the setting content acquired in a case where the setting item is set. As a result, it is possible to prevent printing errors or image reading errors from occurring due to setting errors, due to settings that have been forgotten, and the like in advance. Thus it is possible to improve the usability of the setting screen. As shown in FIGS. 2A-8C, the setting content of setting items in both the basic setting tab and in the detailed setting tab may be reflected in the appearance or configuration of the start button 511e. Further, the configurations illustrated in FIGS. 2A-8C can be combined such that the start button can reflect or advise the user of multiple setting contents simultaneously.

2. Another Embodiment

Also, a technical scope of the invention is not limited to the above-described embodiment, and it is apparent that various changes may be added without departing from the gist of the invention. For example, a case where the print start instruction button is displayed in a situation according to the setting content may be assumed. Many aspects of the start button may be changed. For example, one or more of a color of the whole button, a color of a part of the button, a shape of the whole button, a shape of a part of the button, a size and a position of an area which is caused to function as the button, a rotation angle of the button on the screen, existence/non-existence of inversion of the button on the screen, a pattern in which the button changes according to animation, and the like may be changed according to the setting content.

In addition, a setting item with respect to a color of the printed matter is a setting item related to a change in the color of the printed matter. Further, contrast, color balance, brightness, and the like may be assumed in addition to the setting item with respect to the print density and the setting item with respect to the color print which are described in the above-described embodiment.

In addition, the shape of the print start instruction button may include any one of a shape of the contour of the button and an inner shape of the contour of the button. In addition, the size of the button may be changed while a relationship similar to the shape of the button acquired before change is maintained in one embodiment.

In addition, in the embodiment, an example is described in which the start button is displayed in which the pieces of setting content of the plurality of setting items are respectively reflected if situations which indicate the pieces of setting content of the setting items do not interfere with each other on the design in the case where the pieces of setting content of the plurality of setting items are changed. However, in a case where the pieces of setting content of the plurality of setting items are changed such that the situations which indicate the pieces of setting content of the setting items interfere with each other on the design of the start button, a setting item, in which the setting content is reflected in the start button, and a setting item, in which the setting content is not reflected in the start button, may be selected based on notification priorities determined in advance. Thus, the inclusion of setting contents in the start button may be prioritized when the setting contents interfere with each other in the start button. It is apparent that, even in the case where the situations which indicate the pieces of setting content of the setting items do not interfere with each other on the design, the setting item, in which the setting content is reflected in the start button, and the setting item, in which the setting content is not reflected in the start button, may be selected based on the notification priorities.

In other words, in a case where the pieces of setting content are changed in the plurality of setting items, the start button may be displayed in a situation which does not comply with pieces of setting content of some setting items of the plurality of setting items in order of low notification priorities. Therefore, for example, only setting content of a setting item which has the highest notification priority may be reflected in the start button among a plurality of setting items whose setting is changed. In this case, the pieces of setting content of remaining setting items of the plurality of setting items whose setting is changed may not be reflected in the start button. In a case where the start button is displayed in a situation according to the pieces of setting content of the whole setting items of the plurality of changed setting items, it is conceivable that it is rather difficult to cause the user to recognize the changed setting content. In other words, it may be difficult for a user to recognize a large number of setting contents that are reflected in the start button. In a case where the situation of the start button is caused to become the situation which does not comply with some setting items in order of low notification priorities for the user, a start button is displayed in a situation at least according to setting content of a setting item whose notification priority is the highest, and a situation at least according to setting content of a setting item whose notification priority is the lowest. In other words, setting contents associated with the highest notifications may be represented in the start button while setting contents of lower priority or notifications may not be represented in the start button.

Therefore, compared to a configuration in which the start button is displayed in a situation according to, for example, the whole plurality of changed setting items, it is possible to display a start button in a simple situation, and it is possible to cause the user to efficiently recognize the setting content of the setting item whose notification priority is high. Thus, the number of setting contents reflected in the start button may be less than all of the setting contents. This allows a user to more efficiently recognize the setting content of the setting items whose notification priority is high.

Meanwhile, the notification priorities may be set in advance such that, for example, a higher notification priority is set to or associated with a setting item in which the setting is changed at a high frequency. The notification priorities may be set based on information from a plurality of users. It is possible for each user to individually change the notification priorities of the setting items. Meanwhile, for example, the priorities of the setting items may be set sequentially starting from a highest priority, that is, in order of the setting item with respect to the double side print, the setting item with respect to the density, the setting item with respect to the color print, the setting item with respect to the print magnification, the setting item with respect to the paper size, the setting item with respect to the paper type, the setting item with respect to the feeding method, the setting item with respect to the allocation, the setting item with respect to the print quality, the setting item with respect to the document type, and the setting item with respect to the margin. Therefore, for example, in a case where the user changes the pieces of setting content in order of the setting item with respect to the color print, the setting item with respect to the feeding method, the setting item with respect to the double side print, and the setting item with respect to the print quality, only the setting content of the setting item with respect to the double side print which has the highest notification priority therein may be reflected in the situation or configuration of the start button. However, the specific notification priorities of the setting items can be set differently.

Meanwhile, the notification priorities may be set such that a notification priority of a setting item which is not displayed on the same screen as the start button is higher than a notification priority of a setting item which is displayed on the same screen as the start button. For example, in a case where the user changes the pieces of setting content in order of the setting item with respect to the color print, the setting item with respect to the feeding method, the setting item with respect to the double side print, and the setting item with respect to the print quality, the setting content of the setting item with respect to the feeding method, which may have a higher notification priority, between the setting item with respect to the feeding method and the setting item with respect to the print quality, which are not displayed on the basic setting screen 511 that includes the start button 511e, may be reflected in the situation or configuration of the start button. In a case where setting items, which are displayed on the same screen as the start button, are dynamically changed through scroll and the like, the notification priorities may be dynamically changed in association with the change of the setting items.

In addition, the notification priorities may correspond to orders or the order in which the user performs setting. The reason for this is that settings performed first may be forgotten by the user. Thus, the effect of checking the situation of the start button is increased while the user understands the setting content of a setting item, which is set by the user immediately before the start button is manipulated. The settings set last are likely to be remembered and may not need to be reflected in the situation or configuration of the start button.

Figure 9:
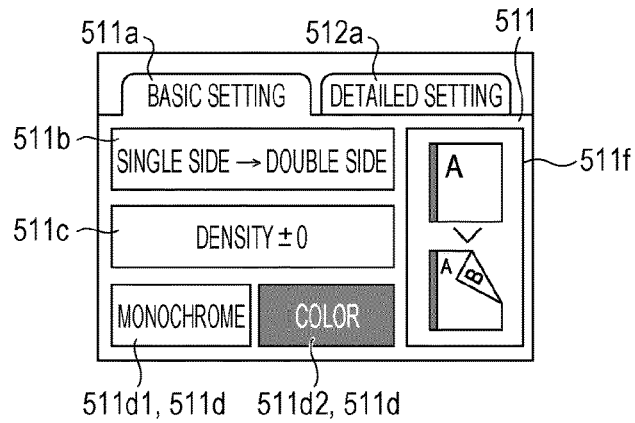
FIG. 9 is a view illustrating a setting screen.

Meanwhile, the start button may have a large occupy ratio for the screen rather than the start button described in the embodiment. For example, an explanatory diagram which illustrates the setting content more specifically rather than the start button 511e of the above-described embodiment may be displayed in an area which is larger than an area occupied by the start button of the above-described embodiment, and the explanatory diagram itself may function as the start button. For example, a start button 511f illustrated in FIG. 9 is displayed in a case where the setting item with respect to the double side print is set to "single side→double side". FIG. 9 illustrates that an explanatory diagram, which illustrates that copy is performed from the single side to the double side, is displayed in the start button 511f.

Meanwhile, it is possible to apply the invention to a scanner. Setting items of a scanner include, for example, a setting item with respect to a read resolution, a setting item with respect to a document type, a setting item with respect to an output destination, a setting item with respect to color setting, a setting item with respect to a document size, a setting item with respect to faded image restoration, a setting item with respect to preview, and the like. Furthermore, in accordance that the start button in which the setting items are reflected is touched by the user, a document is read and an image is produced with the setting items.

FIGS. 10A to 11E illustrate examples of setting screens related to the scan function. The basic setting screen 511 and the detailed setting screen are displayed in a switchable manner in the setting screens related to the scan function. The basic setting screen 511 of the scan function includes, for example, a resolution setting button 511g, an output destination setting button 511h, a color setting button 511d, and a start button 511e. The detailed setting screen of the scan function includes, for example, a document size setting button, a document-type setting button, a faded image restoration setting button, a preview setting button, and the like.

Figure 10A:
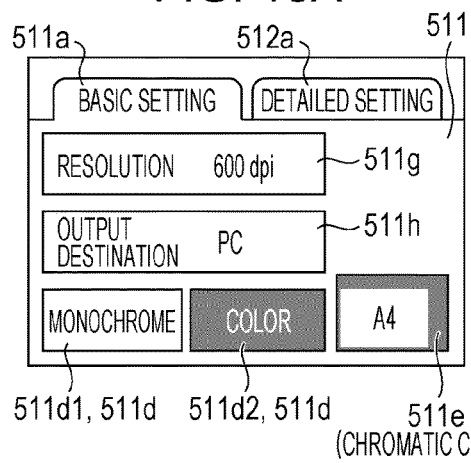
FIGS. 10A to 10D are views illustrating a setting screen.

FIG. 10A illustrates an example in which the start button 511e is displayed according to setting content of the setting item with respect to the document size. In a case where it is detected that the user changes the setting content of the setting item with respect to the document size by manipulating the document size setting button in the detailed setting screen and the basic setting tab 511a is tapped, the control unit 10 displays the start button 511e illustrated in FIG. 10A in the basic setting screen 511. The start button 511e illustrated in FIG. 10A expresses a document table and a document which is mounted thereon. Letters "A4" indicative of the document size are displayed in the rectangular section indicative of the document. A size of the rectangular section indicative of a document for a rectangular section indicative of a document table, and letters indicative of the document size are changed according to the set document size.

Figure 10B:
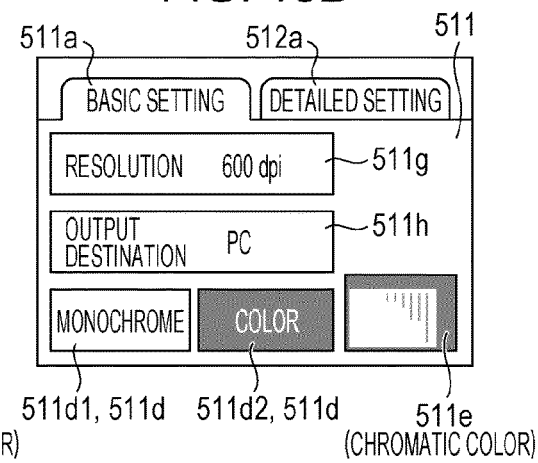

FIG. 10B illustrates an example in which the start button 511e is displayed according to setting content of the setting item with respect to the document type. In a case where it is detected that the user changes the setting content of the setting item with respect to the document type by manipulating the document-type setting button in detailed setting screen and the basic setting tab 511a is tapped, the control unit 10 displays a start button 511e illustrated in FIG. 10B in the basic setting screen 511. The start button 511e illustrated in FIG. 10B also expresses a document table and a document which is mounted thereon. A plurality of lines, which are included in a rectangular section indicative of the document, express that the document is paper. For example, in a case where a picture is set as the document type, a figure indicative of a picture is displayed instead of the rectangular section indicative of the document.

Figure 10C:
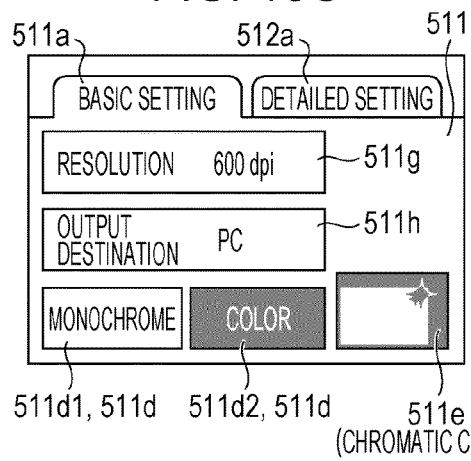

FIG. 10C illustrates an example in which the start button 511e is displayed according to setting content of the setting item with respect to the faded image restoration. In a case where it is detected that the user changes the setting content of the setting item with respect to the faded image restoration to "available" by manipulating the faded image restoration setting button in the detailed setting screen and the basic setting tab 511a is tapped, the control unit 10 displays the start button 511e illustrated in FIG. 10C in the basic setting screen 511. The start button 511e illustrated in FIG. 10C also expresses a document table and a document which is mounted thereon. A fact that the faded image restoration is performed is expressed by disposing a figure indicative of light at an end of the rectangular section indicative of a document.

Figure 10D:
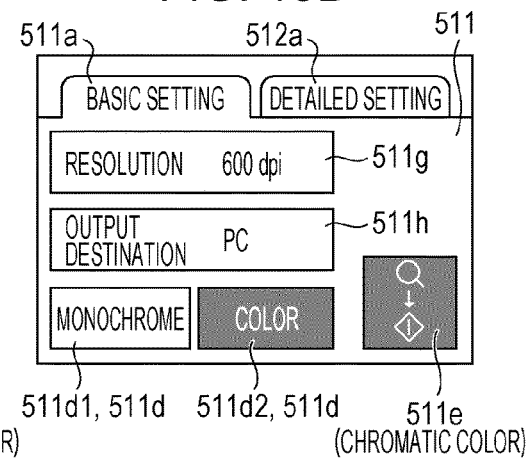

Meanwhile, FIG. 10D illustrates an example in which the start button 511e is displayed in a case where setting content of the setting item with respect to the preview is changed to "preview available".

Figure 11A:
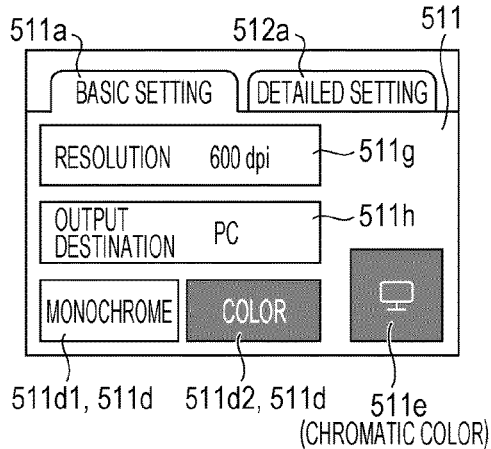
FIGS. 11A to 11E are views illustrating a setting screen.
Figure 11B:
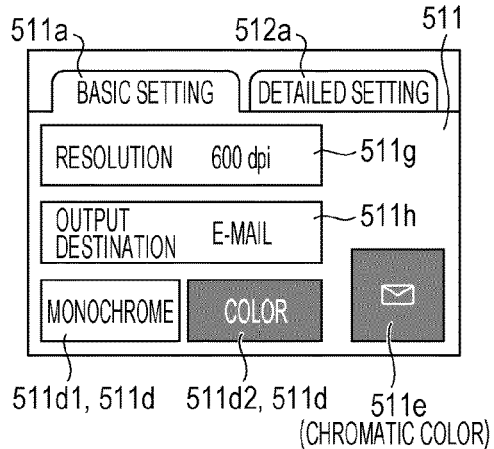
Figure 11C:
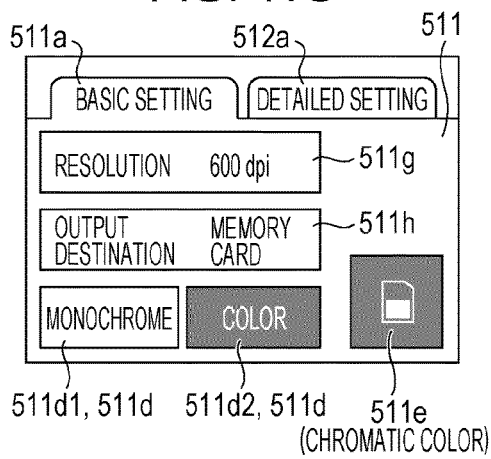
Figure 11D:
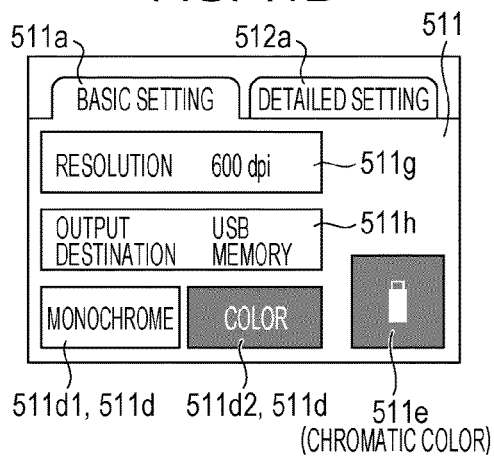
Figure 11E:
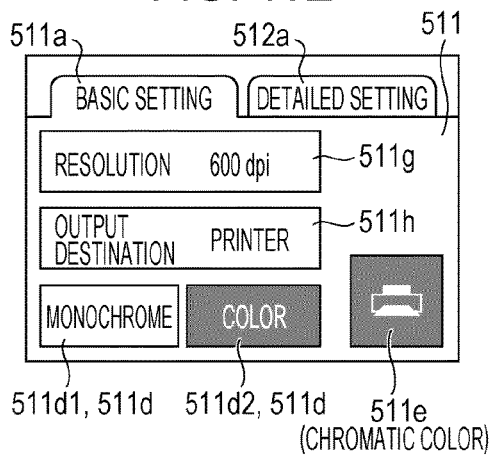

FIGS. 11A to 11E illustrate examples in which the start button 511e is displayed according to setting content of the setting item with respect to the output destination. In a case where it is detected that the user changes the output destination by manipulating the output destination setting button 511h, the control unit 10 changes an image included in the start button 511e of the basic setting screen 511 as illustrated in FIGS. 11A to 11E. Options of the setting content of the setting item with respect to the output destination include, for example, a "Personal Computer (PC)", an "E-mail", a "memory card", a "USB memory", a "printer", and the like. FIG. 11A illustrates the start button 511e in a case where setting is performed such that scanned image data is output to the "PC". Specifically, an image indicative of a PC is displayed in the start button 511e instead of the mark m1 indicative of the start button. FIG. 11B, FIG. 11C, FIG. 11D, FIG. 11E sequentially illustrate the start button 511e in a case where setting is performed such that the image data is attached to the "E-mail" and transmitted, in a case where setting is performed such that the image data is stored in the "memory card", in a case where setting is performed such that the image data is stored in the "USB memory", and in a case where setting is performed such that the image data is printed using the "printer" (that is, performs copy), respectively. Specifically, instead of the mark m1 indicative of the start button, an image indicative of the E-mail, an image indicative of the memory card, an image indicative of the USB memory, or an image indicative of the printer are displayed in the start button 511e.

In addition, there is a possibility that a state in which it is difficult to perform print, copy, or scan occurs such as a case where items which are set to the printer and the scanner are items which are difficult to be simultaneously set. In this case, a grayout start button may be displayed in a shape in which the setting item that is set at that time is reflected such that it is difficult for the user to perform manipulation. Because it is difficult for the start button in a grayout state to perform print or scan, the start button corresponds to a "print start instruction button in a situation according to setting content which is not used for print" or an "image reading start instruction button in a situation according to setting content which is not used for image reading".

In addition, a part or all of the setting items may be set using a method, such as physical keys, other than the touch panel, and the print start instruction button may exist as a physical key in addition to buttons which are displayed on the display.

Meanwhile, embodiments of the invention may be embodied as a method of producing the printed matter and a method of producing an image. Specifically, embodiments of the invention provide the method of producing printed matter may include receiving setting of a setting item with respect to print or printing from a user; displaying a start instruction button in a situation or configuration according to the received setting content, which is used for the print, on a touch panel type display; and producing printed matter by performing the print based on the received setting content, which is used for the print, in accordance that the user touches the start instruction button in the situation according to the setting content which is used for the print. The method of producing an image may include receiving setting of a setting item with respect to image reading from a user; displaying a start instruction button in a situation according to the received setting content, which is used for the image reading, on a touch panel type display; and producing printed matter by performing the image reading based on the received setting content, which is used for the image reading, in accordance that the user touches the start instruction button in the situation according to the setting content which is used for the image reading. In addition, embodiments of the invention may be embodied as a control program of the printing apparatus and a control program of the image reading apparatus. In addition, embodiments of the invention may include or relate to control programs of a PC, a smart phone, and a tablet terminal, which control the printing apparatus or the image reading apparatus. In addition, functions of respective units disclosed in claims may be realized by hardware resources whose functions are specified in the configurations thereof, software resources whose functions are specified by programs, or combinations thereof. In addition, functions of the respective units are not limited to realization through hardware resources which are physically independent from each other.

What is claimed is:
1. A printing apparatus comprising:
a touch panel display; and
a control unit configured to perform the following:
   display a user interface on the touch panel display, the user interface including (1) one or more selectable configuration settings for the printing apparatus and (2) a start button that, when selected, causes the printing apparatus to perform a printing operation;
   determine a current state of the one or more selectable configuration settings; and update an appearance of the start button to reflect the current state of the one or more selectable configuration settings,
wherein updating the appearance of the start button includes one or more of:
adjusting a color of the start button,
adjusting a size of the start button, and/or
adjusting a shape of the start button.

2. The printing apparatus of claim 1, wherein the one or more selectable configuration settings are displayed on the user interface simultaneously with the start button.

3. The printing apparatus of claim 1, wherein the one or more selectable configuration settings includes a print color setting, the print color setting providing an option to switch between a chromatic print setting and a monochromatic print setting, and wherein updating the appearance of the start button includes causing the start button's color to be chromatic when the chromatic print setting is selected and causing the start button's color to be monochromatic when the monochromatic print setting is selected.

4. The printing apparatus of claim 1, wherein the one or more selectable configuration settings includes an option to select a number of printing operations that are to be performed when the start button is selected, and wherein updating the appearance of the start button includes causing a print number corresponding to the number of printing operations to be displayed on the start button.

5. The printing apparatus of claim 1, wherein each of the one or more selectable configuration settings is assigned a priority, and wherein the start button's appearance is updated to reflect only the current state of configuration settings whose priority is above a determined priority, whereby the start button's appearance reflects only a subset of the one or more configuration settings.

6. The printing apparatus of claim 1, wherein the control unit is further configured to:
display a setting item that corresponds to the printing operation, wherein both the setting item and the start button are displayed on the touch panel display;
monitor the setting item to detect a change to its state; and
in response to the setting item's changed state, update a visual appearance of the start button to reflect the setting item's changed state.

7. The printing apparatus of claim 1, wherein the control unit is further configured to:
display a setting item corresponding to the printing operation, the setting item and the start button both being displayed on the touch panel display in a situation according to setting content,
wherein the setting content is set by the setting item and is used for the printing operation, and
wherein the setting item is one of a plurality of setting items, each of at least some of the plurality of setting items being assigned a priority, the priority being used to determine whether a current state of each of the at least some of the plurality of setting items will be reflected by a visual appearance of the start button.

8. An image reading apparatus comprising:
a touch panel display; and
a control unit configured to perform the following:
display a user interface on the touch panel display, the user interface including (1) one or more selectable configuration settings for the image reading apparatus and (2) a start button that, when selected, causes the image reading apparatus to perform a scanning operation;
determine a current state of the one or more selectable configuration settings; and
update an appearance of the start button to reflect the current state of the one or more selectable configuration settings,
wherein updating the appearance of the start button includes one or more of:
adjusting a color of the start button,
adjusting a size of the start button, and/or
adjusting a shape of the start button.

9. The image reading apparatus of claim 8, wherein the control unit is further configured to:
display a setting item that corresponds to the scanning operation, wherein both the setting item and the start button are displayed on the touch panel display;
monitor the setting item to detect a change to its state; and
in response to the setting item's changed state, update a visual appearance of the start button to reflect the setting item's changed state.

10. The image reading apparatus of claim 8, wherein the control unit is further configured to:
display a setting item corresponding to the scanning operation, the setting item and the start button both being displayed on the touch panel display in a situation according to setting content,
wherein the setting content is set by the setting item and is used for the scanning operation, and
wherein the setting item is one of a plurality of setting items, each of at least some of the plurality of setting items being assigned a priority, the priority being used to determine whether a current state of each of the at least some of the plurality of setting items will be reflected by a visual appearance of the start button.

11. A method of producing printed matter comprising:
displaying a user interface on a touch panel display, the user interface including (1) one or more selectable configuration settings for a printing apparatus and (2) a start button that, when selected, causes the printing apparatus to perform a printing operation;
determining a current state of the one or more selectable configuration settings;
updating an appearance of the start button to reflect the current state of the one or more selectable configuration settings,
wherein updating the appearance of the start button includes one or more of:
adjusting a color of the start button,
adjusting a size of the start button, and/or
adjusting a shape of the start button; and
in response to the start button being selected, producing a printed matter by performing the print operation, the print operation being performed in accordance with the current state of the one or more selectable configuration settings.

12. The method of claim 11, wherein the method further includes:
displaying a setting item that corresponds to the printing operation, wherein both the setting item and the start button are displayed on the touch panel display;
monitoring the setting item to detect a change to its state; and
in response to the setting item's changed state, updating a visual appearance of the start button to reflect the setting item's changed state.

13. The method of claim 11, wherein the method further includes:
- displaying a setting item corresponding to the printing operation, the setting item and the start button both being displayed on the touch panel display in a situation according to setting content,
- wherein the setting content is set by the setting item and is used for the printing operation, and
- wherein the setting item is one of a plurality of setting items, each of at least some of the plurality of setting items being assigned a priority, the priority being used to determine whether a current state of each of the at least some of the plurality of setting items will be reflected by a visual appearance of the start button.

14. A computer system comprising:
- one or more central processing units; and
- memory having stored thereon computer-executable instructions that are structured to be executable by the one or more central processing units to thereby cause the computer system to:
  - display a user interface on a touch panel display, the user interface including (1) one or more selectable configuration settings for the computer system and (2) a start button;
  - determine a current state of the one or more selectable configuration settings; and
  - update an appearance of the start button to reflect the current state of the one or more selectable configuration settings,
    - wherein updating the appearance of the start button includes one or more of:
      - adjusting a color of the start button,
      - adjusting a size of the start button, and/or
      - adjusting a shape of the start button.

15. The computer system of claim 14, wherein the one or more configuration settings includes at least two configuration settings, and wherein the start button's appearance is updated to simultaneously reflect current states for the at least two configuration settings.

16. The computer system of claim 14, wherein the computer system is a part of a printing apparatus and/or an image reading apparatus such that the start button, when selected, causes the printing apparatus to perform a printing operation and/or causes the image reading apparatus to perform a scanning operation.

17. The computer system of claim 14, wherein execution of the computer-executable instructions further causes the computer system to:
- display a setting item that corresponds to the computer system, wherein both the setting item and the start button are displayed on the touch panel display;
- monitor the setting item to detect a change to its state; and
- in response to the setting item's changed state, update a visual appearance of the start button to reflect the setting item's changed state.

18. The computer system of claim 14, wherein execution of the computer-executable instructions further causes the computer system to:
- display a setting item corresponding to the computer system, the setting item and the start button both being displayed on the touch panel display in a situation according to setting content,
- wherein the setting content is set by the setting item, and
- wherein the setting item is one of a plurality of setting items, each of at least some of the plurality of setting items being assigned a priority, the priority being used to determine whether a current state of each of the at least some of the plurality of setting items will be reflected by a visual appearance of the start button.

* * * * *